United States Patent [19]
Shimada

[11] Patent Number: 6,074,067
[45] Date of Patent: Jun. 13, 2000

[54] FIXING AND COVERING STRUCTURE FOR A REFLECTION MIRROR

[75] Inventor: Takehiko Shimada, Yokohama, Japan

[73] Assignee: Equestrian Co., Ltd., Tokyo, Japan

[21] Appl. No.: 08/947,162

[22] Filed: Oct. 8, 1997

[51] Int. Cl.[7] ................................................. G02B 5/08
[52] U.S. Cl. ........................ 359/850; 359/853; 359/867
[58] Field of Search .................................... 359/850, 853, 359/855, 867, 869; 126/685, 693, 696; 362/346

[56] References Cited

U.S. PATENT DOCUMENTS

| | | | |
|---|---|---|---|
| 4,108,154 | 8/1978 | Nelson | 126/270 |
| 4,115,177 | 9/1978 | Nelson | 156/245 |
| 5,071,243 | 12/1991 | Bronstein | 359/867 |
| 5,150,253 | 9/1992 | Watanuki | 359/845 |
| 5,323,271 | 6/1994 | Shimada | 359/845 |
| 5,444,576 | 8/1995 | Shimada | 359/845 |

*Primary Examiner*—Cassandra Spyrou
*Assistant Examiner*—Euncha Cherry
*Attorney, Agent, or Firm*—McDermott, Will & Emery

[57] ABSTRACT

A fixing and covering structure for a reflection mirror in which a pair of base bodies each having a curved inner surface are assembled to form a substantially semi-cylindrical reflection surface. The fixing and covering structure includes cover members and fixing elements. Each of the cover member has a shape conforming to the shape of the corresponding end of a semi-cylindrical space defined by the semi-cylindrical reflection surface and a plurality of holes formed dt positions that face the corresponding longitudinal end surface of each of the base bodies. Each of the fixing elements is disposed to penetrate the corresponding hole to fix the cover member to the base body.

1 Claim, 2 Drawing Sheets

FIXING AND COVERING STRUCTURE FOR A REFLECTION MIRROR

BACKGROUND OF THE INVENTION

1. Field of the Invention

The present Invention relates to a fixing and covering structure for a reflection mirror which is composed of a plurality of base body blocks.

2. Description of the Related Art

Such a reflection mirror is disclosed in, for example, U.S. Pat. No. 5,444,576 (Aug. 22, 1995). In the reflection mirror disclosed in the U.S. patent, a plurality of base body blocks each having a curved inner surface are assembled to complete a reflection mirror.

Such a reflection mirror is usually fixedly installed into an exposure apparatus or the like, but may be hand-held by an operator in some applications such as inspection of objects through use of ultraviolet rays. In the latter case, a portable-type reflection mirror is used. For example, in the inspection of objects through use of ultraviolet rays, a portable-type reflection mirror combined with a ultraviolet source is used. Specifically, ultraviolet rays are reflected by the reflection mirror and are radiated onto a possibly damaged area of an object where a crack or the like may be generated, in order to cause a reaction of a chemical that has previously been penetrated into the damaged area, and the reaction of the chemical is visually checked to detect the damage.

However, if the reflection mirror disclosed in U.S. Pat. No. 5,444,576 is used in such inspection, the hand of the operator Is exposed to ultraviolet rays, because the reflection mirror disclosed in U.S. Pat. No. 5,444,576 has no covers at the longitudinal ends thereof and therefore ultraviolet rays leak through the longitudinal ends. In such case, the hand or body of the operator may be adversely affected by ultraviolet rays.

SUMMARY OF THE INVENTION

An object of the present invention is to solve the above-mentioned problems and to provide an improved fixing and covering structure for a reflection mirror, which structure uses cover members that function as covers for preventing leakage of reflected light rays and also function as fixing means for fixing together base body blocks.

To achieve the above object, the present invention provides a fixing and covering structure for a reflection mirror in which a pair of base bodies each having a curved inner surface are assembled to form a substantially semi-cylindrical reflection surface. The fixing and covering structure includes cover members and fixing elements. Each cover member has a shape conforming to the shape of the corresponding and of a semi-cylindrical space defined by the semi-cylindrical reflection surface, as well as a plurality of holes formed at positions that face the corresponding longitudinal end surface of each of the base bodies. Each of the fixing elements is disposed to penetrate the corresponding hole to fix the cover member to the corresponding base body to thereby unite the pair of base bodies.

The fixing and covering structure for a reflection mirror according to the present invention has the following advantages:

(a) Since the longitudinal ends of the reflection mirror are covered by the cover members, leakage of reflected light rays is prevented, so that an operator is not exposed to the reflected light rays, resulting in increased safety.

(b) In addition to the covering function, the cover members have a function of joining the pair of base bodies. Therefore, the number of parts can be decreased, and assembly work is facilitated.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DESCRIPTION OF THE PREFERRED EMBODIMENT

An embodiment of the present invention will now be described with reference to the drawings.

Figure 1:
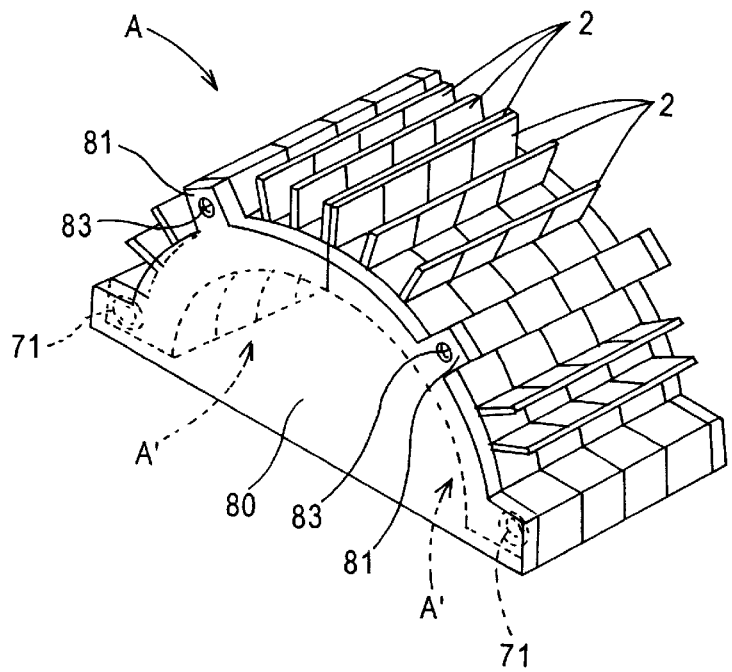
FIG. 1 is a perspective view showing a reflection mirror to which the covering and fixing structure of the present invention is applied.
Figure 2:
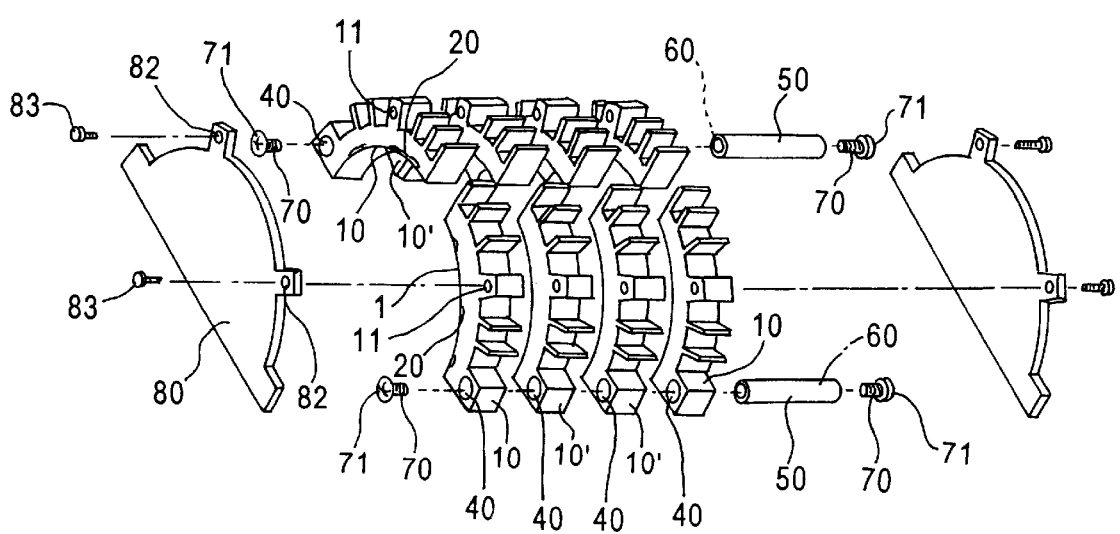
FIG. 2 is an exploded perspective view of the reflection mirror of FIG. 1.
Figure 3:
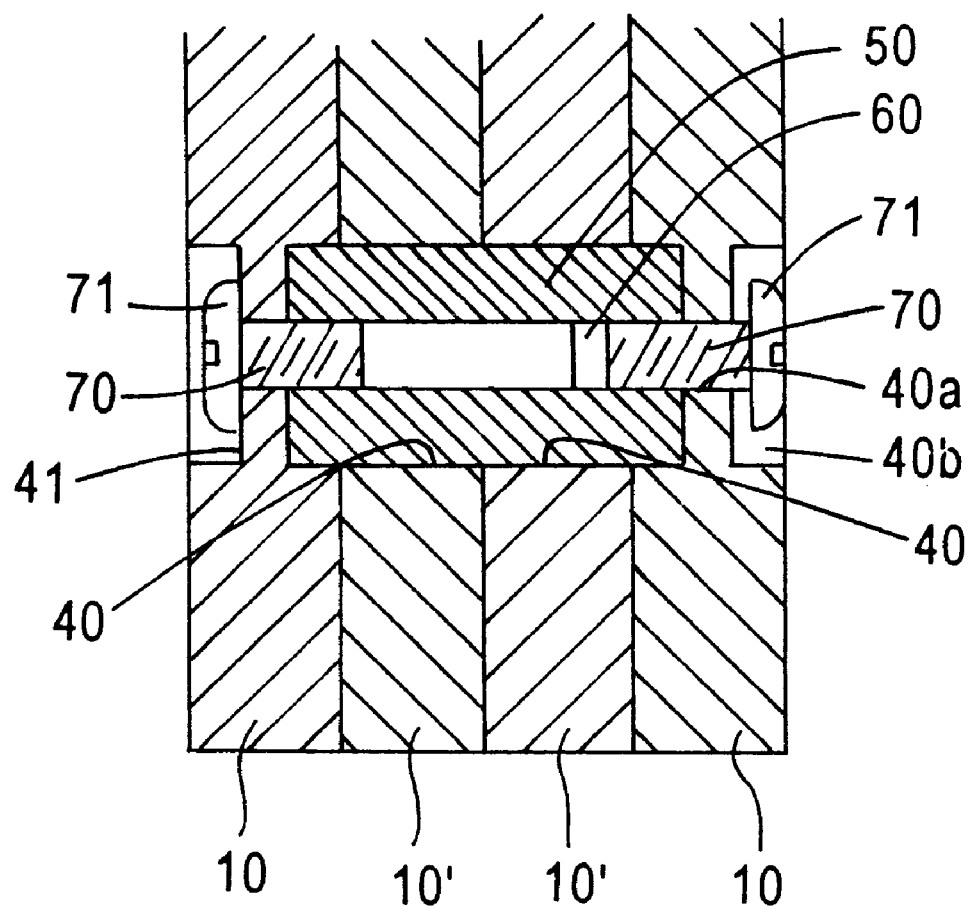
FIG. 3 is a partial sectional view showing the structure for assembling base body blocks.

Referring to FIG. 1, a reflection mirror A is composed of a pair of bass bodies A', each of which is composed of a plurality of base body blocks 10 and 10'. Each of the base body blocks 10 and 10' has a curved inner surface 20 on which an optical reflection layer is formed. As shown in FIGS. 2 and 3, a through hole 40 is formed in each of the bass body blocks 10 and 10' such that when the base body blocks 10 and 10' are arranged in line in a predetermined configuration, the through holes 40 of the base body blocks 10 and 10' are aligned with one another. A support shaft 50 formed of a pipe is removably inserted into the through holes 40 of the base body blocks 10 and 10'. Tightening screws 70 are screw-engaged with female thread portions 60 formed at the opposite ends of the support shaft 50. Through tightening the tightening screw 70, the plurality of base body blocks 10 and 10' are firmly assembled to complete the base body A'. The pair of the base bodies A' are assembled to complete the reflection mirror A having a substantially semi-cylindrical reflection surface. A cover member 80 is fixed to each of the opposite longitudinal ends of the base bodies A' in order to join together the base bodies A'.

Next, the fixing and covering structure of the present invention will be described in detail. Each of the cover members 80 has a semicircular shape corresponding to the shape of the longitudinal end surface of a semi-cylindrical apace defined by the semi-cylindrical reflection surface. Attachment tongues 81 project from the periphery of each of the cover members 80. The angular positions of the attachment tongues 81 correspond to those of mounting portions provided on the base body blocks 10 and 10'. Small holes 82 are formed in the attachment tongues 81 such that the small holes 82 are aligned with female threads 11 formed in the mounting portions of the base body blocks 10. Screws 83 are inserted into the small holes 82 and screwed into the female threads 11 in order to fix the cover member 80 to the base bodies A' and to join the base bodies A' together. In addition to the cover member 80, another member may be used to join the base bodies A' together.

Next, the structure for firmly assembling the base body blocks 10 and 10' to construct the base bodies A' will be described in detail.

As shown in FIGS. 2 and 3, each of the intermediate blocks 10' has the through hole 40 extending over its width, while each of the outermost blocks 10 has the through hole 40 at the inner side, a smaller-diameter hole 40a at the intermediate portion, and a recess 40b for accommodating the head 71 of the tightening nut 70 at the outer side in the thicknesswise direction. Thus, a stepped portion 41 is formed between the recess 40b and the smaller-diameter hole 40a. The through hole 40.has a diameter equal to or slightly larger than that of the support shaft 50. The smaller-diameter holes 40a have a diameter slightly larger than that of the thread portions of the screws 70.

When the base body blocks 10 and 10' are assembled, the support shaft 50 is disposed within the holes 40, and the tightening screws 70 are passed through the smaller-diameter holes 40a and screwed into the female thread portions 60 of the support shaft 50. As a result, tile base body blocks 10 and 10' are firmly held between the head portions 71 of the screws 70. The support shaft may be a solid bar having a circular or rectangular cross section. Although not illustrated, the structure for joining the base body blocks 10 and 10' may be modified as follows:

(1) A flange portion is formed at one end of the support shaft 50, and the male thread portion 60 is formed at the other end of the support shaft 50, A nut is screw-engaged with the thread portion 60, so that the base body blocks 10 and 10' are firmly held between the flange portion and the nut.

(2) A male thread portion is projected from either end of the support shaft 50, and a nut is screw-engaged with the male thread portion.

Each of the base body blocks 10 and 10' is manufactured as follows. An elongated member formed of light metal is extruded through use of an extrusion former such that the elongated member has a cross section curved along a quarter ellipse. The elongated member is then cut to a desired width to thereby form the plurality of base body blocks 10 and 10' each having a desired width. The inner surface 20 of each of the base body blocks 10 and 10' are machined along the curve of a quarter ellipse in accordance with data representing a desired luminous intensity pattern. Also, the above-described through holes 40, the smaller-diameter holes 40a and the recesses 40b are formed. Subsequently, the reflection layer is formed on the curved surface 20 through plating.

More specifically, in the present invention, aluminum to aluminum alloy is used as a material for the base body block, since aluminum is relatively softer and easier to cut. Since aluminum has a relatively low melting point (660° C.), aluminum may be extruded through a special-steel die having a predetermined cross section to thereby be formed into a desired shape.

In this embodiment, there is obtained an elongated member which has a curve of a quarter ellipse on the inner side and a plurality of radiation fins 2 on the outer side. The radiation fins 2 are provided for air cooling. The distance between adjacent radiation fins 2 may be determined such that an unillustrated pipe through which cooling water is passed can be disposed between adjacent radiation fins, in consideration of the case where water cooling is utilized in addition to air cooling.

The elongated member is then cut to an appropriate width so as to obtain the base body blocks 10 and 10'. Subsequently, the curved surface 20 is machined so as to provide a desired luminous intensity pattern. This machining can be done relatively quick. In this machining process, a machine tool is used under control of a computer into which data representing a luminous intensity pattern are input, so that a cutting tool moves according to the input data. Further, the above-described through holes 40, the smaller-diameter holes 40a and the recesses 40b are formed.

The reflection layer is formed through vapor-deposition. After the curved surface 20 of each of the base body blocks 10 and 10' is carefully smoothed through polishing, a nickel plating layer for improving directivity is formed on the curved surface 20. Then, a glossy plating layer, for example, a chromium plating layer is formed on the nickel plating layer. The chromium plating layer may be coated with a black material. Depending on the size of a lamp, the curved surface 20 may be curved along a quarter circle. Preferably, the inner surface of the cover members 80 is plated in order to increase the reflectance. Alternatively, the cover member may be formed of aluminum plate whose brightness has been improved through bright heat treating or the like.

Obviously, numerous modifications and variations of the present invention are possible in light of the above teachings. It is therefore to be understood that within the scope of the appended claims, the present invention nay be practiced otherwise than as specifically described herein.

What is claimed is:

1. A fixing and covering structure for a reflection mirror in which a pair of base bodies each having a curved inner surface are assembled to form a substantially semi-cylindrical reflection surface, said fixing and covering structure comprising:

a cover member having a shape conforming to a shape of a corresponding end of a semi-cylindrical space defined by the semi-cylindrical reflection surface;

a first element connecting said cover member to one of the pair of base bodies; and a second element connecting said cover member to another of the pair of base bodies, whereby the pair of base bodies are united.

* * * * *